United States Patent
Ohno

(10) Patent No.: US 11,472,368 B2
(45) Date of Patent: Oct. 18, 2022

(54) OCCUPANT CRASH PROTECTION AND VEHICLE SEAT

(71) Applicant: Toyota Jidosha Kabushiki Kaisha, Toyota (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/245,884

(22) Filed: Apr. 30, 2021

(65) Prior Publication Data
US 2022/0041129 A1 Feb. 10, 2022

(30) Foreign Application Priority Data
Aug. 7, 2020 (JP) .............................. JP2020-135086

(51) Int. Cl.
*B60R 22/195* (2006.01)
*B60R 21/013* (2006.01)
*B60R 21/207* (2006.01)
*B60R 21/01* (2006.01)

(52) U.S. Cl.
CPC ........ *B60R 22/1954* (2013.01); *B60R 21/013* (2013.01); *B60R 21/207* (2013.01); *B60R 2021/01272* (2013.01)

(58) Field of Classification Search
CPC ... B60R 22/1954; B60R 22/28; B60R 21/013; B60R 21/207; B60R 2021/01272; B60R 2021/01279
See application file for complete search history.

(56) References Cited

U.S. PATENT DOCUMENTS

| | | | |
|---|---|---|---|
| 2006/0267317 A1* | 11/2006 | Ida ....................... | B60N 2/4249 280/730.2 |
| 2010/0123301 A1* | 5/2010 | Thomas .............. | B60R 22/1954 280/733 |
| 2011/0006507 A1* | 1/2011 | Fukawatase ........... | B60R 22/26 280/733 |
| 2019/0193674 A1 | 6/2019 | Fukawatase et al. | |

(Continued)

FOREIGN PATENT DOCUMENTS

| JP | 2004299657 A | * | 10/2004 |
|---|---|---|---|
| JP | 2009137441 A | * | 6/2009 |
| JP | 4792935 B2 | * | 10/2011 |

(Continued)

OTHER PUBLICATIONS

Akaike, Seat for Vehicle, Oct. 28, 2004, EPO, JP 2004299657 A, Machine Translation of Description (Year: 2004).*

*Primary Examiner* — James A English
*Assistant Examiner* — Matthew D Lee
(74) *Attorney, Agent, or Firm* — Dinsmore & Shohl LLP

(57) ABSTRACT

An occupant crash protection includes: a seatbelt that restrains a front-seat occupant sitting in a front seat; a retractor that is installed inside a seatback of the front seat and reels in one end side of the seatbelt, inserted inside the seatback, so as to allow the seatbelt to be pulled out; and a rear-seat airbag module that is installed inside the seatback, on a seat rear side relative to the seatbelt, and inflates and deploys an airbag toward the seat rear side of the seatback while inflating a part of the airbag toward a seat front side so as to press the seatbelt toward the seat front side.

11 Claims, 12 Drawing Sheets

(56) References Cited

U.S. PATENT DOCUMENTS

2020/0369231 A1    11/2020  Usami

FOREIGN PATENT DOCUMENTS

| JP | 2012176702 A | * | 9/2012 | ........... B60N 2/4235 |
| JP | 2014028546 A | * | 2/2014 | ........... B60R 21/207 |
| JP | 2019-031151 A |   | 2/2019 | |
| JP | 2019-031166 A |   | 2/2019 | |
| JP | 2019-111992 A |   | 7/2019 | |
| JP | 2021160417 A | * | 10/2021 | ........... B60R 21/207 |

* cited by examiner

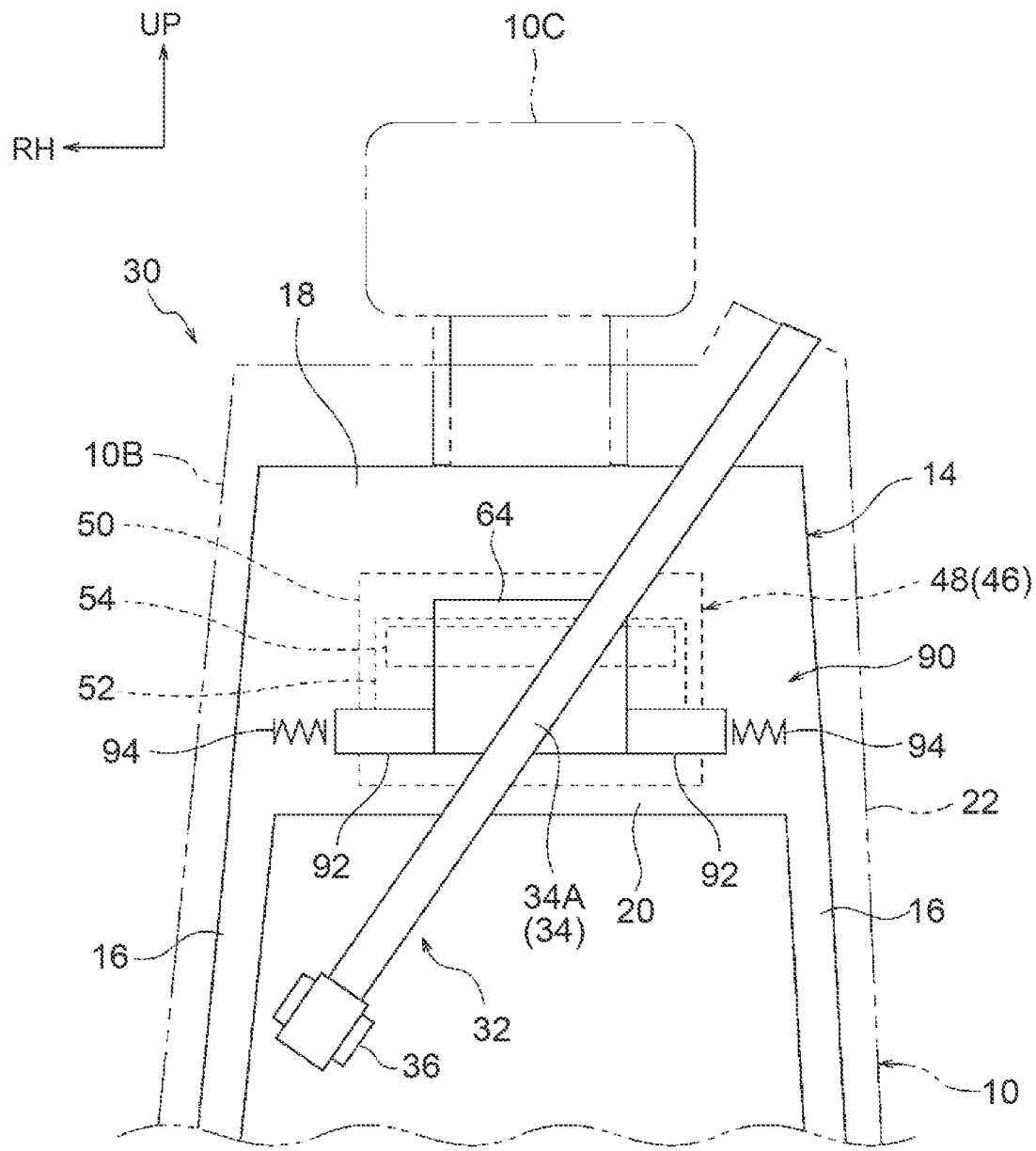

OCCUPANT CRASH PROTECTION AND VEHICLE SEAT

CROSS-REFERENCE TO RELATED APPLICATION

This application claims priority to Japanese Patent Application No. 2020-135086 filed on Aug. 7, 2020, incorporated herein by reference in its entirety.

BACKGROUND

1. Technical Field

The disclosure relates to an occupant crash protection that is installed in a vehicle seat, and a vehicle seat in which the occupant crash protection is installed.

2. Description of Related Art

In the vehicle seat disclosed in Japanese Unexamined Patent Application Publication No. 2019-031151, a rear-seat airbag module that inflates and deploys an airbag toward a rear side to protect an occupant in a rear seat is installed at an upper-half part of a seatback frame.

In the vehicle seat disclosed in Japanese Unexamined Patent Application Publication No. 2019-111992, a retractor of a seatbelt that restrains an occupant sitting in the vehicle seat and a pretensioner mechanism that causes the retractor to forcibly reel in the seatbelt are installed at an upper part of a seatback frame.

SUMMARY

In vehicles capable of self-driving, the retractor, the pretensioner mechanism, etc. that are seatbelt parts of a front seat be installed inside the seatback of the front seat to allow variations in the seat arrangement of the front seats including the driver's seat. The rear-seat airbag module that protects an occupant in the rear seat may also be installed inside the seatback of the front seat. However, in small vehicles, for example, securing an accommodation space for an occupant in the rear seat requires reducing the thickness of the seatback of the front seat in a vehicle front-rear direction. Consequently, it is difficult to secure an installation space for the retractor, the pretensioner mechanism, and the rear-seat airbag module inside the seatback of the front seat.

In view of this fact, the disclosure aims to provide an occupant crash protection and a vehicle seat that allow a reduction in the thickness of a seatback, while securing initial restraining performance of a seatbelt by a pretensioner function, in a configuration in which a retractor of the seatbelt and a rear-seat airbag module are installed inside the seatback.

An occupant crash protection of a first aspect of the disclosure includes: a seatbelt that restrains an occupant sitting in a vehicle seat; a retractor that is installed inside a seatback of the vehicle seat and reels in one end side of the seatbelt, inserted inside the seatback, so as to allow the seatbelt to be pulled out; and a rear-seat airbag module that is installed inside the seatback, on a seat rear side relative to the seatbelt, and inflates and deploys an airbag toward the seat rear side of the seatback while inflating a part of the airbag toward a seat front side so as to press the seatbelt toward the seat front side.

In the first aspect, an occupant siting in the vehicle seat is restrained by the seatbelt. One end side of this seatbelt is inserted inside the seatback and reeled in by the retractor, installed inside the seatback, such that the seatbelt can be pulled out. The rear-seat airbag module is installed inside the seatback, on the seat rear side relative to the seatbelt. The rear-seat airbag module inflates and deploys the airbag toward the seat rear side of the seatback. In this case, a part of the airbag inflates toward the seat front side and presses the seatbelt toward the seat front side. Thus, a pretensioner function of removing the slack in the seatbelt is fulfilled, and initial restraining performance of the seatbelt can be thereby secured. Moreover, there is no need to install a dedicated pretensioner mechanism inside the seatback, which allows a reduction in the thickness of the seatback.

An occupant crash protection of a second aspect of the disclosure is the occupant crash protection of the first aspect, further including a pressing member that is supported so as to be able to shift in a seat front-rear direction relatively to a frame of the seatback, and that shifts toward the seat front side under an inflation pressure of the part of the airbag and presses the seatbelt toward the seat front side.

In the second aspect, when the airbag of the rear-seat airbag module inflates and deploys, the pressing member that is supported so as to be able to shift in the seat front-rear direction relatively to the frame of the seatback shifts toward the seat front side under the inflation pressure of the part of the airbag. As the seatbelt is pressed toward the seat front side by the pressing member, the seatbelt can be effectively pressed toward the seat front side. As a result, the initial restraining performance of the seatbelt by a pretensioner function can be enhanced.

An occupant crash protection of a third aspect of the disclosure is the occupant crash protection of the second aspect, wherein the pressing member is supported so as to be able to turn relatively to the frame.

In the third aspect, the pressing member is supported so as to be able to turn in the seat front-rear direction relatively to the frame of the seatback. This configuration can simplify the support structure for the pressing member compared with a configuration in which, for example, the pressing member is supported so as to be able to slide in the seat front-rear direction relatively to the frame of the seatback.

An occupant crash protection of a fourth aspect of the disclosure is the occupant crash protection of the second aspect or the third aspect, wherein the rear-seat airbag module has an airbag case that houses the airbag and is mounted on the frame, and the pressing member is mounted on the airbag case so as to be able to shift relatively to the airbag case.

In the fourth aspect, the pressing member is mounted on the airbag case that houses the airbag and is mounted on the frame of the seatback, so as to be able to shift relatively to the airbag case. Thus, there is no need to separately mount the airbag case and the pressing member to the frame of the seatback, which facilitates the work of attaching parts to the frame of the seatback.

An occupant crash protection of a fifth aspect of the disclosure is the occupant crash protection of the first aspect, wherein the rear-seat airbag module has an airbag case that houses the airbag and is mounted on a frame of the seatback. The airbag case has an opening through which the part of the inflating and deploying airbag bulges toward the seat front side, and the seatbelt is pressed toward the seat front side by the part.

In the fifth aspect, the airbag case that houses the airbag and is mounted on the frame of the seatback has the opening through which the part of the inflating and deploying airbag bulges toward the seat front side. The seatbelt is pressed toward the seat front side by the part of the airbag thus bulging. This configuration is simple compared with the configuration including the pressing member.

An occupant crash protection of a sixth aspect of the disclosure is the occupant crash protection of the fifth aspect, wherein the rear-seat airbag module has a fabric member that is interposed between an edge of the opening and the airbag.

In the sixth aspect, the fabric member is interposed between the edge of the opening of the airbag case and the airbag. When the fabric member is manufactured using a slippery fabric, for example, the part of the airbag can bulge easily through the opening.

An occupant crash protection of a seventh aspect of the disclosure is the occupant crash protection of any one of the second aspect to the fourth aspect, further including a force limiter mechanism that has an energy absorbing member supported on the frame of the seatback and shifts the energy absorbing member toward the seat rear side of the pressing member as the pressing member shifts toward the seat front side. The energy absorbing member deforms when a restraining load exerted by the seatbelt on the occupant is applied to the energy absorbing member through the pressing member.

In the seventh aspect, the force limiter mechanism supported on the frame of the seatback shifts the energy absorbing member toward the seat rear side of the pressing member as the pressing member shifts toward the seat front side. The restraining load exerted by the seatbelt on the occupant is applied to the energy absorbing member through the pressing member. Thus, the energy absorbing member deforms, and a force limiter function is fulfilled. As a result, the likelihood that the seatbelt may place an excessive load on the chest etc. of the occupant can be reduced.

An occupant crash protection of an eighth aspect of the disclosure is the occupant crash protection of the seventh aspect, wherein the force limiter mechanism has an urging member that presses the energy absorbing member against the pressing member that has not yet shifted toward the seat front side. As the pressing member shifts toward the seat front side, the energy absorbing member shifts toward the seat rear side of the pressing member under an urging force of the urging member.

In the eighth aspect, the energy absorbing member of the force limiter mechanism is pressed by the urging member against the pressing member that has not yet shifted toward the seat front side. When the pressing member shifts toward the seat front side, the energy absorbing member shifts toward the seat rear side of the pressing member under the urging force of the urging member. Thus, using the urging member can simplify the configuration for shifting the energy absorbing member.

A vehicle seat of a ninth aspect of the disclosure includes a seat main body having a seat cushion and a seatback, and the occupant crash protection according to any one of the first aspect to the eighth aspect that has the retractor and the rear-seat airbag module installed inside the seatback.

In the ninth aspect, the vehicle seat has the seat cushion and the seatback. Inside the seatback, the retractor and the rear-seat airbag module that are constituent elements of the occupant crash protection are installed. Since this occupant crash protection is the occupant crash protection according to any one of the first aspect to the eighth aspect, the above-described workings and effects can be produced.

As has been described above, the occupant crash protection and the vehicle seat according to the disclosure allow a reduction in the thickness of a seatback, while securing initial restraining performance of a seatbelt by a pretensioner function, in a configuration in which a retractor of the seatbelt and a rear-seat airbag module are installed inside the seatback.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 is a front view, as seen from the vehicle front side, showing a configuration around the rear-seat airbag module in a vehicle seat according to a fourth embodiment;

DETAILED DESCRIPTION OF EMBODIMENTS

First Embodiment

Figure 1:
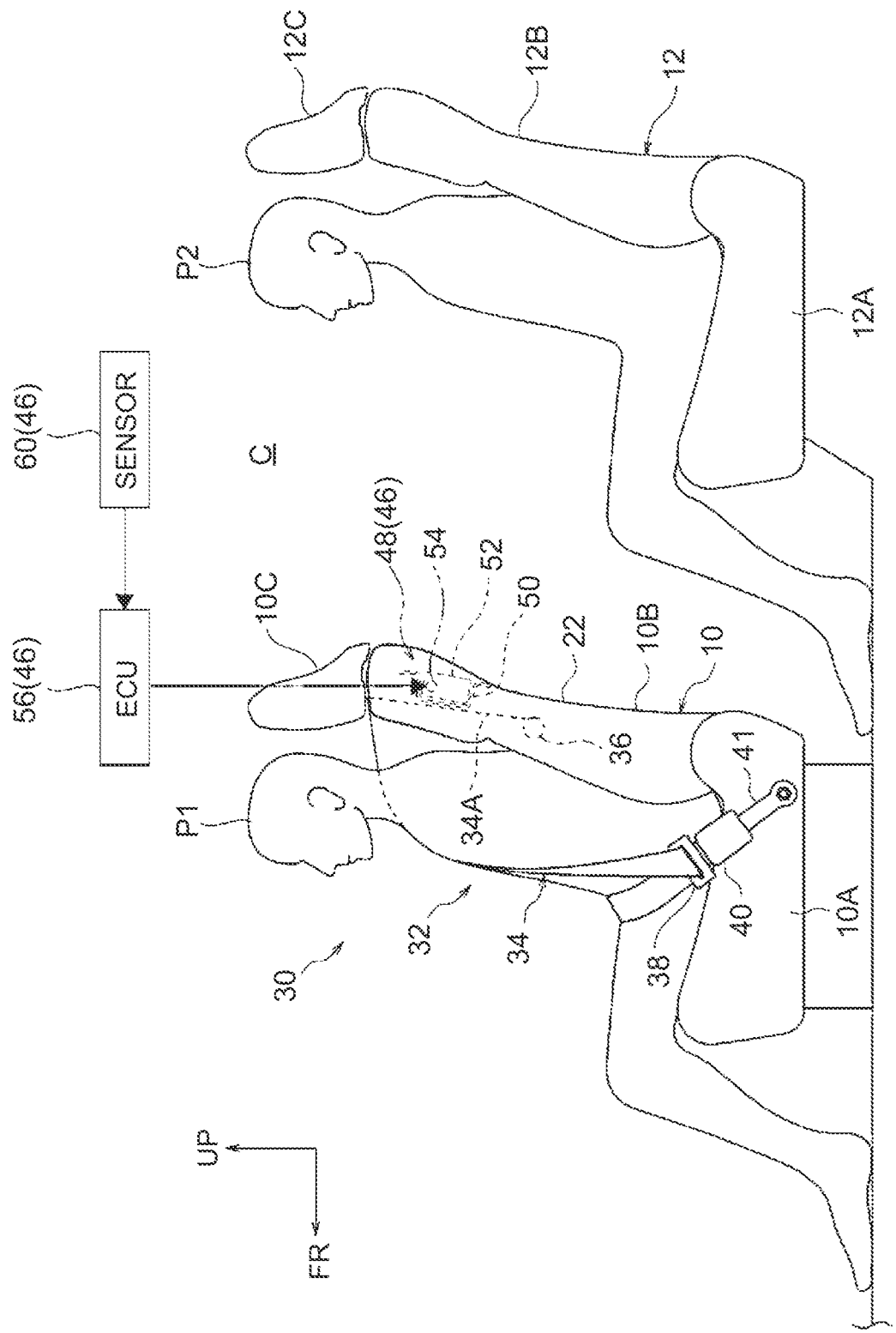
FIG. 1 is a side view, as seen from a vehicle left side, showing an inside of a cabin of a vehicle in which a vehicle seat according to a first embodiment is installed.

A front seat 10 as a vehicle seat according to a first embodiment of the disclosure will be described below using FIG. 1 to FIG. 4. To make the drawings easy to view, some reference signs or some members may be omitted from the drawings. Arrows FR, UP, and RH shown as necessary in the drawings indicate a front side, an upper side, and a right side, respectively, of a vehicle in which the front seat 10 is installed. Unless otherwise noted, the directions of front, rear, right, left, up, and down used alone in the following description mean front and rear in a vehicle front-rear direction, right and left in a vehicle right-left direction (vehicle width direction), and up and down in a vehicle up-down direction.

Configuration

FIG. 1 is a side view of an inside of a cabin C of the vehicle in which the front seat 10 according to this embodiment is installed. This vehicle is, for example, a sedan-type automobile, and a rear seat 12 is disposed behind the front seat 10. The directions of front, rear, right, left, up, and down in the front seat 10 and the rear seat 12 correspond to the directions of front, rear, right, left, up, and down in the vehicle. The front seat 10 and the rear seat 12 have seat cushions 10A, 12A, seatbacks 10B, 12B, and headrests 10C, 12C.

While the disclosure is applied in this embodiment to the front seat 10 that is a frontmost seat of the vehicle, the application is not limited thereto. The vehicle seat according to the disclosure may be a seat in a second or subsequent row of the vehicle. Also in this configuration, another vehicle seat should be disposed behind the vehicle seat according to the disclosure. Occupants P1, P2 sitting in the front seat 10 and the rear seat 12 in FIG. 1 are, for example, dummies of AM50 (representing a 50th percentile American adult male). Hereinafter, the occupant P1 sitting in the front seat 10 will be referred to as a "front-seat occupant P1," and the occupant P2 sitting in the rear seat 12 will be referred to as a "rear-seat occupant P2."

Figure 2:
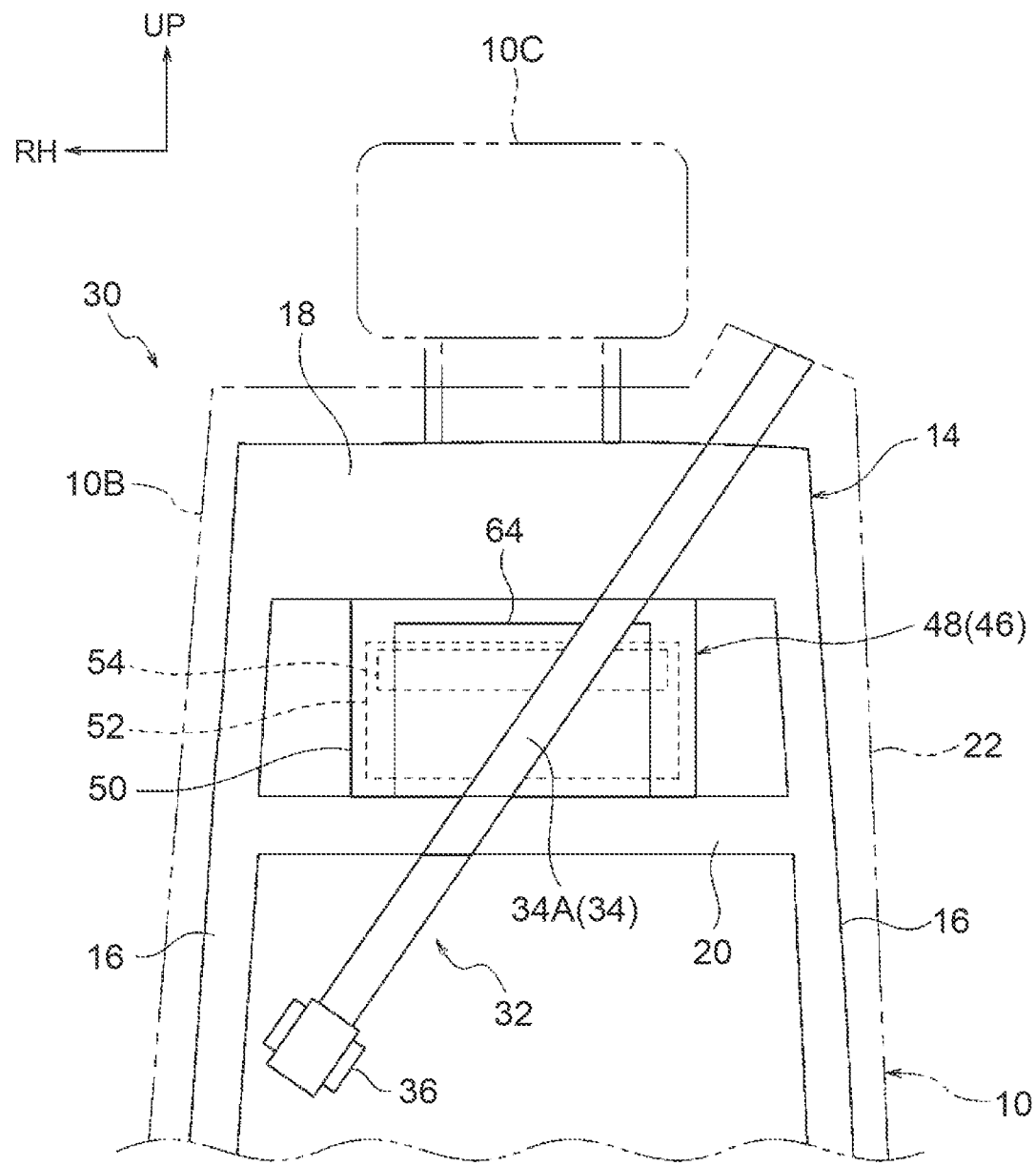
FIG. 2 is a front view, as seen from a vehicle front side, showing a configuration around a rear-seat airbag module in the vehicle seat according to the first embodiment.

As shown in FIG. 2, the seatback 10B of the front seat 10 includes a frame 14 that is a framework member. The frame 14 has a pair of right and left side frame parts 16, an upper frame part 18, and an intermediate frame part 20. The right and left side frame parts 16 extend in an up-down direction of the seatback 10B inside right and left side parts of the seatback 10B, and are coupled at lower ends thereof to a frame (not shown) of the seat cushion 10A. The upper frame part 18 is suspended between upper ends of the right and left side frame parts 16 and extends in a right-left direction. The intermediate frame part 20 is disposed on a lower side of the seatback 10B relative to the upper frame part 18, is suspended between upper portions of the right and left side frame parts 16, and extends in the right-left direction.

The right and left side frame parts 16, the upper frame part 18, and the intermediate frame part 20 are formed by sheet metal, for example. As one example, the right and left side frame parts 16 each have an open cross-sectional shape that is open on an inner side in the right-left direction as seen from the up-down direction. As one example, the upper frame part 18 has a rectangular closed cross-sectional shape as seen from the right-left direction. As one example, the intermediate frame part 20 has an open cross-sectional shape that is open on a front side as seen from the right-left direction. A back pad (not shown) constituting a cushion material of the seatback 10B is put over the frame 14 thus configured. The back pad is covered with a skin 22 of the seatback 10B.

Figure 3:
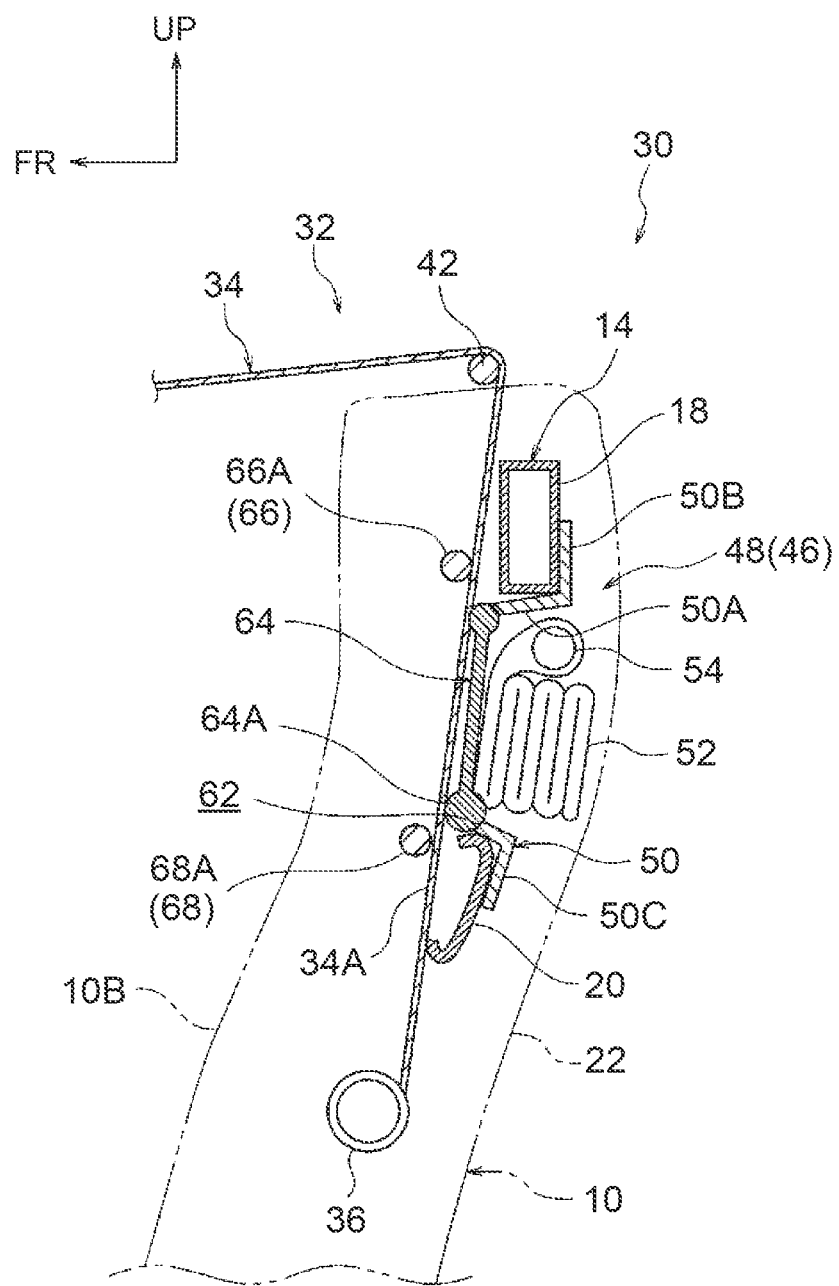
FIG. 3 is a sectional view, as seen from the vehicle left side, showing the configuration around the rear-seat airbag module in the vehicle seat according to the first embodiment.

As shown in FIG. 1 to FIG. 3, the front seat 10 is provided with a seatbelt device 32 that restrains the front-seat occupant P1 and a rear-seat airbag module 48 that protects the rear-seat occupant P2. The seatbelt device 32 and the rear-seat airbag module 48 constitute parts of an occupant crash protection 30 according to this embodiment. Although this is not shown, the rear seat 12 is provided with a seatbelt device that restrains the rear-seat occupant.

The seatbelt device 32 includes a long band-shaped seatbelt (webbing) 34, a retractor (webbing reeling device) 36, a tongue 38, and a buckle 40. As shown in FIG. 3, the seatbelt 34 is wound on a belt guide 42 that is mounted at one end in the right-left direction (here, a left end) of an upper end of the seatback 10B. As one example, the belt guide 42 has a columnar shape with an axial direction thereof lying in the right-left direction. An elongated hole (not shown) is formed in an upper end surface of the seatback 10B under the belt guide 42, and one end side 34A of the seatbelt 34 is inserted into the seatback 10B through the elongated hole.

The one end side 34A of the seatbelt 34 inserted inside the seatback 10B is disposed on the front side relative to the frame 14. As shown in FIG. 2, the one end side 34A of the seatbelt 34 extends inside the seatback 10B in a direction inclined toward a right lower side. When the belt guide 42 and the elongated hole are provided at a right end of the upper end of the seatback 10B, the one end side 34A of the seatbelt 34 extends inside the seatback 10B in a direction inclined toward a left lower side.

The retractor 36 is disposed inside the seatback 10B, at an intermediate part thereof in the up-down direction, and one end of the seatbelt 34 is engaged on a reeling shaft (not shown) of the retractor 36. The retractor 36 is configured to reel in the one end side 34A of the seatbelt 34 so as to allow the seatbelt 34 to be pulled out. The retractor 36 is an emergency locking retractor (ELR) and, in the event of a frontal collision of the vehicle, locks the seatbelt 34 so as not to be pulled out.

The other end (not shown) of the seatbelt 34 is engaged on an anchor plate (not shown) that is fixed to the seat cushion 10A etc. on one side (here, the right side) of the front seat 10. An intermediate part of the seatbelt 34 is passed through an elongated hole (reference sign omitted) formed in the tongue 38. Thus, the tongue 38 is mounted on the intermediate part of the seatbelt 34 so as to be able to slide. The buckle 40 is disposed on one side (here, the left side) of the seat cushion 10A and coupled to the seat cushion 10A through a bracket 41. Coupling the tongue 38 to the buckle 40 leaves the front-seat occupant P1 wearing the seatbelt 34.

The rear-seat airbag module 48 is installed at an upper part of the inside of the seatback 10B. The rear-seat airbag module 48 constitutes a main part of a rear-seat airbag device 46 that protects (restrains) the rear-seat occupant P2 in the event of a frontal collision of the vehicle. The rear-seat airbag module 48 is disposed in a position facing the one end side 34A of the seatbelt 34 from the rear side, and is fixed to an upper part of the frame 14. The rear-seat airbag module 48 includes a module case 50, and an airbag 52 and an inflator 54 that are housed inside the module case 50.

The module case 50 is made of metal, for example. The module case 50 includes a case main body 50A having a box shape that is open on the rear side, an upper flange 50B extending from an upper edge of a rear end of the case main body 50A toward a seat upper side, and a lower flange 50C extending from a lower edge of the rear end of the case main body 50A toward a seat lower side. The module case 50 has a hat-shaped cross-section that is open on the rear side as seen from the right-left direction. The case main body 50A is disposed between the upper frame part 18 and the intermediate frame part 20. The upper flange 50B is disposed on the rear side of the upper frame part 18, while the lower flange 50C is disposed on the rear side of the intermediate frame part 20. The upper and lower flanges 50B, 50C are fixed to the upper frame part 18 and the intermediate frame part 20, respectively, by bolt fastening.

The airbag 52 is formed by, for example, sewing a plurality of sheets of base fabric together into a bag shape, and is housed inside the module case 50 in a state of being folded by a predetermined folding method. The inflator 54 is, for example, of a columnar cylinder type, and is housed inside the airbag 52 in a posture with an axial direction thereof lying along the right-left direction. Alternatively, the inflator 54 may be of a disc type having a circular plate shape.

As one example, the inflator 54 is disposed inside the module case 50, on a rear end side of an upper end thereof. The inflator 54 is held by a retainer that has, for example, a substantially cylindrical shape, and the retainer has, for example, a pair of stud bolts (not shown) that protrude toward the seat upper side and are provided side by side in the right-left direction. For example, these stud bolts extend through an upper wall of the case main body 50A and are screwed into nuts (not shown). The inflator 54 is thereby fixed to the module case 50.

As shown in FIG. 1, an airbag ECU 56 installed in the vehicle is electrically connected to the inflator 54. The airbag ECU 56 is a control device that controls activation of the inflator 54, and is disposed, for example, under a center console (not shown) of the vehicle. A crash sensor 60 installed in the vehicle is electrically connected to the airbag ECU 56. The crash sensor 60 is, for example, an acceleration sensor and installed at a front end of the vehicle. The crash sensor 60 is configured to detect a frontal collision based on the rate of acceleration occurring in the vehicle. Instead of the crash sensor 60, a collision prediction sensor (e.g., an outside camera or a radar) that predicts a frontal collision of the vehicle may be electrically connected to the airbag ECU 56.

The airbag ECU 56 outputs an activation signal to the inflator 54 upon detecting a frontal collision of the vehicle based on an electrical signal output from the crash sensor 60. When the inflator 54 is thereby activated, the airbag 52 starts to inflate and deploy under the pressure of a gas for inflation and deployment generated by the inflator 54. The airbag 52 inflates toward the rear side while being subjected to a reaction force of the module case 50 from the front side. As a result, a portion designed to rupture that is provided in the skin 22 of the seatback 10B ruptures under the inflation pressure of the airbag 52 on the rear side of the module case 50. This rupture creates an opening (not shown) in a rear surface of the skin 22, and the airbag 52 inflates and deploys toward the rear side through this opening (the state shown in FIG. 4). The airbag 52 having inflated and deployed is disposed on the front side of the upper body of the rear-seat occupant P2. Thus, the upper body of the rear-seat occupant P2 who moves inertially toward the front side due to the impact of a frontal collision is protected (restrained) by the airbag 52.

Main Parts of Embodiment

Next, main parts of this embodiment will be described. In this embodiment, an opening 62 having, for example, a rectangular shape as seen from the front-rear direction is formed in a front wall of the case main body 50A of the module case 50 that is a wall facing the front side. Thus, a part 52A of the inflating airbag 52 bulges toward the front side through the opening 62. The opening 62 is disposed in a position facing the one end side 34A of the seatbelt 34 from the rear side. A pressing member 64 is disposed between the opening 62 and the one end side 34A of the seatbelt 34.

As one example, the pressing member 64 has a plate shape with a plate thickness direction thereof lying in the front-rear direction. An upper end of the pressing member 64 is coupled to an upper edge of the opening 62 in the module case 50 so as to be able to turn around an axis extending in the right-left direction. Thus, the pressing member 64 is supported so as to be able to shift (here, turn) in the front-rear direction relatively to the frame 14 of the seatback 10B. A columnar part 64A having a substantially columnar shape with an axial direction thereof lying in the right-left direction is formed at a lower end of the pressing member 64. Thus, a lower end surface of the pressing member 64 is formed as a curved surface.

As shown in FIG. 3, a pair of upper and lower holding members 66, 68 (not shown in FIG. 2) that hold the seatbelt 34 so as to be able to slide in the up-down direction are provided one on each side of the pressing member 64 in the up-down direction. The upper and lower holding members 66, 68 have columnar main bodies 66A, 68A with an axial direction thereof lying in the right-left direction, and right and left legs (not shown) extending from both ends of the main bodies 66A, 68A in the right-left direction toward the rear side. The right and left legs of the upper holding member 66 are fixed to the upper frame part 18, while the right and left legs of the lower holding member 68 are fixed to the intermediate frame part 20. The main bodies 66A, 68A of the upper and lower holding members 66, 68 contact or closely face the one end side 34A of the seatbelt 34 from the front side. The holding members 66, 68 are configured to restrict the one end side 34A of the seatbelt 34 from shifting toward the front side on both sides, in the up-down direction, of the part 52A of the airbag 52 that bulges toward the front side through the opening 62 of the module case 50.

Figure 4:
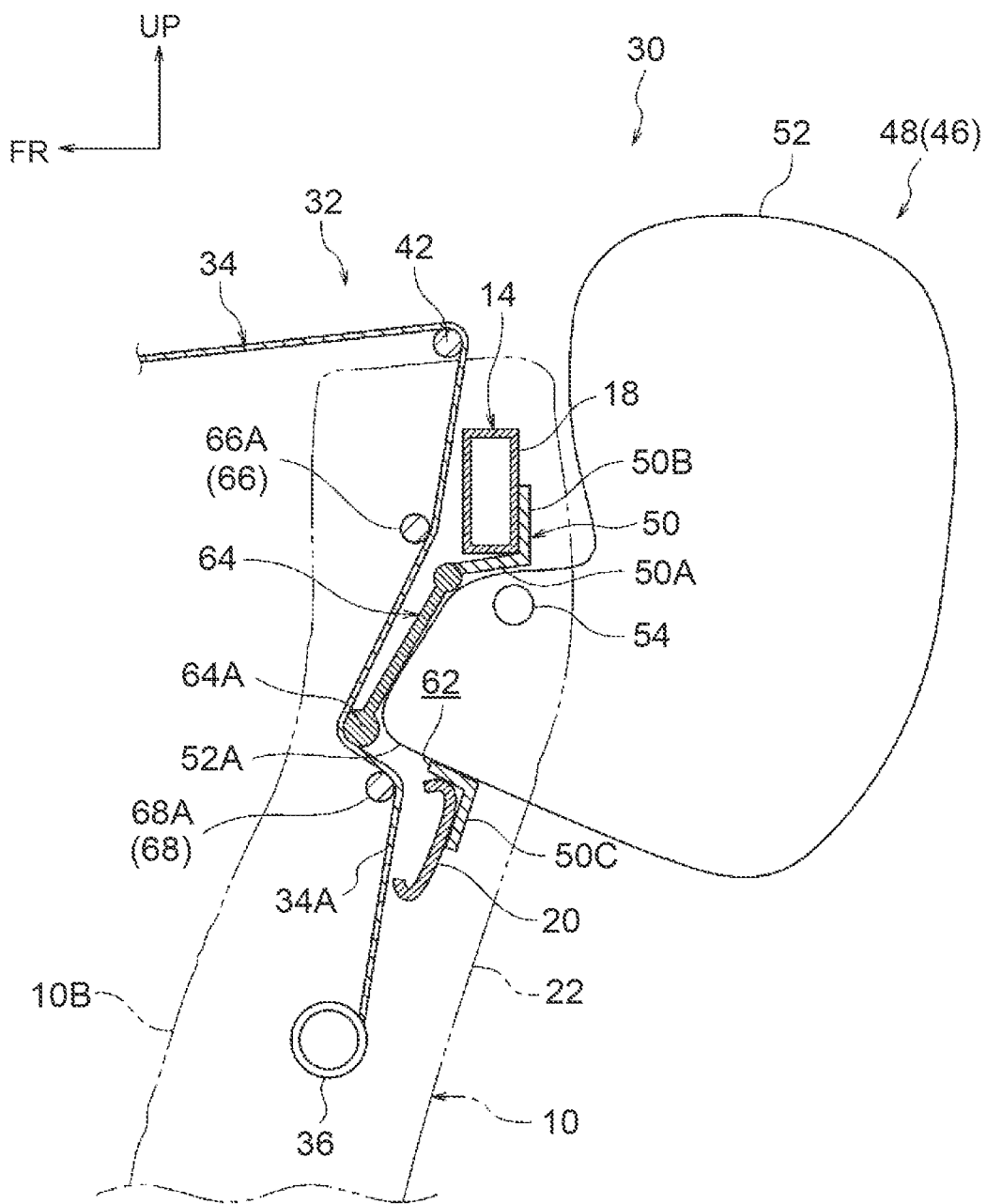
FIG. 4 is a sectional view corresponding to FIG. 3, showing a state where an airbag of the rear-seat airbag module has inflated and deployed in the vehicle seat according to the first embodiment.

At normal times, the pressing member 64 is disposed in a retracted position shown in FIG. 3. In this state, the pressing member 64 extends parallel or substantially parallel to the one end side 34A of the seatbelt 34, and the columnar part 64A formed at the lower end of the pressing member 64 contacts or closely faces the one end side 34A of the seatbelt 34 from the rear side. On the other hand, when the airbag 52 inflates and deploys as shown in FIG. 4, the part 52A of the airbag 52 bulges toward the front side through the opening 62 of the module case 50, and the pressing member 64 turns (shifts) to an advanced position shown in FIG. 4 under the inflation pressure of the part 52A. Thus, the one end side 34A of the seatbelt 34 is pressed toward the front side by the columnar part 64A formed at the lower end of the pressing member 64. As a result, the slack in the seatbelt 34 is removed and the tensile force of the seatbelt 34 increases.

Workings and Effects

Next, the workings and effects of this embodiment will be described.

In this embodiment, the occupant P1 sitting in the front seat 10 is restrained by the seatbelt 34. The one end side 34A of the seatbelt 34 is inserted inside the seatback 10B and reeled in by the retractor 36, installed inside the seatback 10B, such that the seatbelt 34 can be pulled out. The rear-seat airbag module 48 is installed inside the seatback 10B, on the rear side relative to the one end side 34A of the seatbelt 34. In the event of a frontal collision of the vehicle, the rear-seat airbag module 48 inflates and deploys the airbag 52 toward the rear side of the seatback 10B. In this case, the part 52A of the airbag 52 inflates toward the front side and presses the seatbelt 34 toward the front side through the pressing member 64. Thus, the slack in the seatbelt 34 is removed and a pretensioner function is fulfilled, and initial restraining performance of the seatbelt 34 can be thereby secured. Moreover, there is no need to install a dedicated pretensioner mechanism inside the seatback 10B. Therefore, the thickness of the seatback 10B in the front-rear direction can be reduced compared with when a dedicated pretensioner mechanism is disposed inside the seatback 10B in addition to the retractor 36 and the rear-seat airbag module 48.

In this embodiment, when the airbag 52 of the rear-seat airbag module 48 inflates and deploys, the pressing member 64 that is supported so as to be able to shift in the front-rear direction relatively to the frame 14 of the seatback 10B shifts toward the front side under the inflation pressure of the part 52A of the airbag 52. As the one end side 34A of the seatbelt 34 is pressed toward the front side by the pressing member 64, the one end side 34A of the seatbelt 34 can be effectively pressed toward the front side. As a result, the initial restraining performance of the seatbelt 34 by a pretensioner function can be enhanced.

Moreover, the pressing member 64 is supported so as to be able to turn in the front-rear direction relatively to the frame 14 of the seatback 10B. This configuration can simplify the support structure for the pressing member 64 compared with a configuration in which, for example, the pressing member 64 is supported so as to be able to slide in the front-rear direction relatively to the frame 14 of the seatback 10B.

Furthermore, in this embodiment, the pressing member 64 is mounted on the module case 50 that houses the airbag 52 and is mounted on the frame 14 of the seatback 10B, so as to be able to turn relatively to the module case 50, and the pressing member 64 is supported on the frame 14 through the module case 50. Thus, there is no need to separately mount the module case 50 and the pressing member 64 to the frame 14 of the seatback 10B, which facilitates the work of attaching parts to the frame 14 of the seatback 10B.

In the first embodiment, the pressing member 64 is mounted so as to be able to turn relatively to the module case 50, but the disclosure is not limited to this configuration. A configuration may be adopted in which the pressing member that is mounted on the module case 50 so as to be able to slide relatively to the module case 50 slides toward the front side under the inflation pressure of the part 52A of the airbag 52 and presses the one end side 34A of the seatbelt 34 toward the front side. Or a configuration may be adopted in which, for example, the front wall of the module case 50 is made of an elastic material and has a form of a diaphragm, and this front wall is elastically deformed toward the front side under the inflation pressure of the part 52A of the airbag 52. In this case, the front wall in the form of a diaphragm constitutes the pressing member. Further, for example, a tear line may be set in the front wall of the module case 50, and the front wall of the module case 50 may be ruptured along this tear line under the inflation pressure of the part 52A of the airbag 52 so as to turn toward the front side like a door. In this case, the front wall that turns like a door constitutes the pressing member.

Next, other embodiments of the disclosure will be described. For components and workings that are basically the same as in the first embodiment, the same reference signs will be used as in the first embodiment while the description thereof will be omitted.

Second Embodiment

Figure 5:
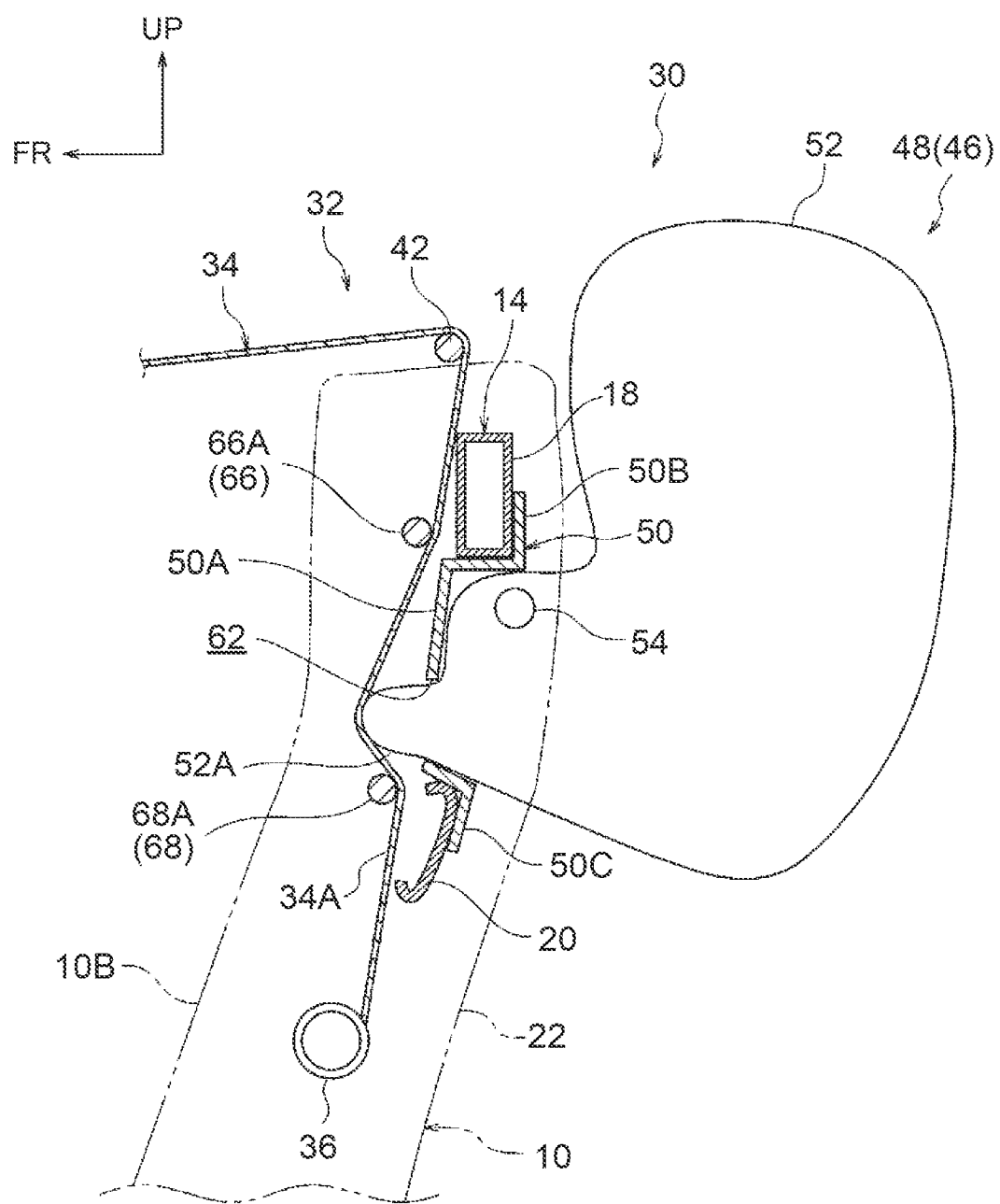
FIG. 5 is a sectional view, as seen from the vehicle left side, showing a configuration around the rear-seat airbag module in a vehicle seat according to a second embodiment.

FIG. 5 is a sectional view, as seen from the vehicle left side, showing a configuration around the rear-seat airbag module 48 in the front seat 10 as a vehicle seat according to a second embodiment of the disclosure. In this embodiment, the pressing member 64 according to the first embodiment is not provided, and the opening 62 of the module case 50 is formed so as to be smaller than that in the first embodiment. As one example, the opening 62 is formed at a lower part of the module case 50 and disposed in a position facing the one end side 34A of the seatbelt 34 from the rear side. In this embodiment, when the airbag 52 inflates and deploys, the part 52A of the airbag 52 bulges toward the front side through the opening 62 and directly presses the one end side 34A of the seatbelt 34 toward the front side. Thus, the slack in the seatbelt 34 is removed.

The configuration of this embodiment is otherwise the same as that of the first embodiment. Also in this embodiment, as in the first embodiment, it is possible to reduce the thickness of the seatback while securing the initial restraining performance of the seatbelt by a pretensioner function. Moreover, the configuration of this embodiment is simple compared with that of the first embodiment that includes the pressing member 64.

Figure 6:
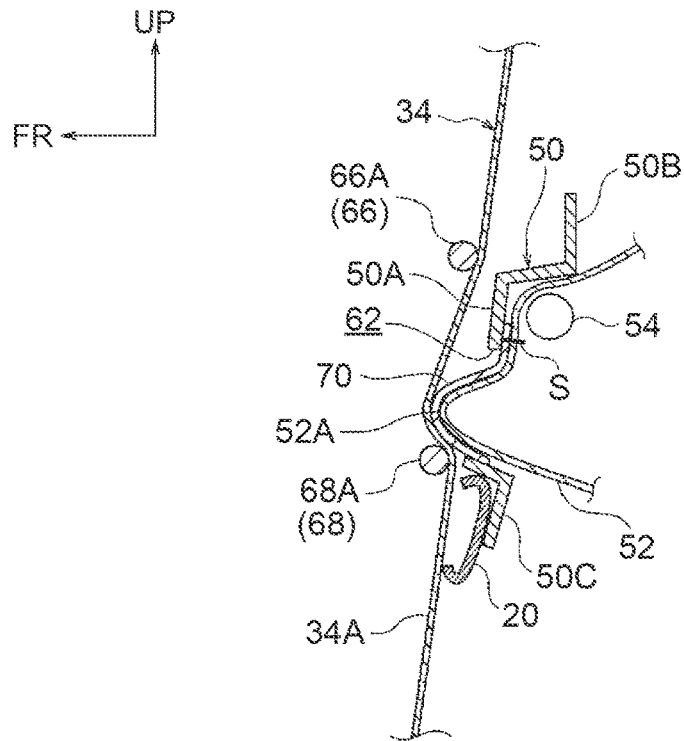
FIG. 6 is a sectional view corresponding to part of FIG. 5, showing a first modified example of the second embodiment.
Figure 7:
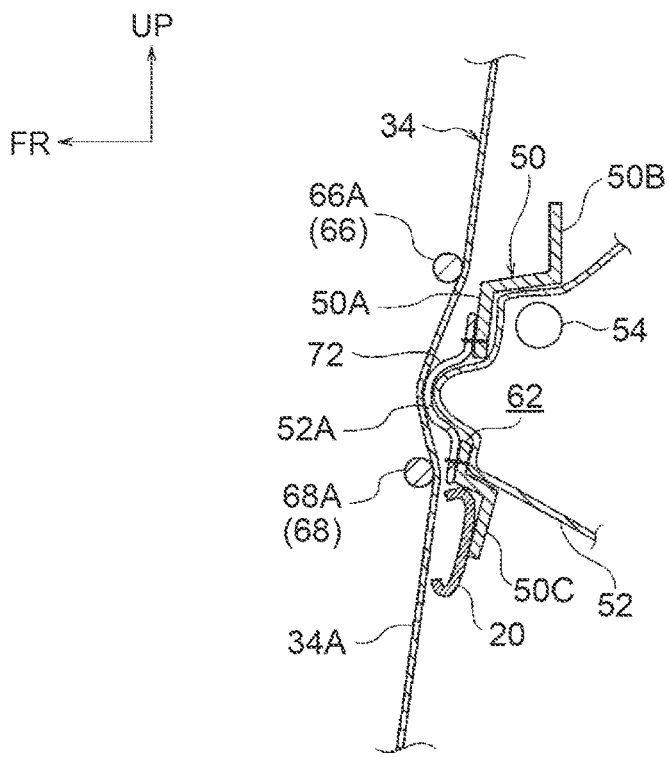
FIG. 7 is a sectional view corresponding to part of FIG. 5, showing a second modified example of the second embodiment.

In the second embodiment, another fabric member may be interposed between the edge of the opening 62 of the module case 50 and the airbag 52. Specifically, for example, in a first modified example shown in FIG. 6, a fabric member 70 that is sewn to the airbag 52 at a seam S is interposed between the edge of the opening 62 and the airbag 52 when the airbag 52 inflates and deploys. Further, for example, in a second modified example shown in FIG. 7, a fabric member 72 is mounted on the front wall of the module case 50 so as to close the opening 62. In these modified examples, the part 52A of the airbag 52 bulging toward the front side through the opening 62 presses the one end side 34A of the seatbelt 34 through the fabric members 70, 72. The fabric members 70, 72 are formed by, for example, a fabric that is more slippery than the base fabric of the airbag 52. Therefore, the part 52A of the airbag 52 can bulge easily toward the front side through the opening 62. Moreover, since the base fabric of the airbag 52 can be protected by the fabric members 70, 72, damage to the airbag 52 can be prevented.

Third Embodiment

Figure 8:
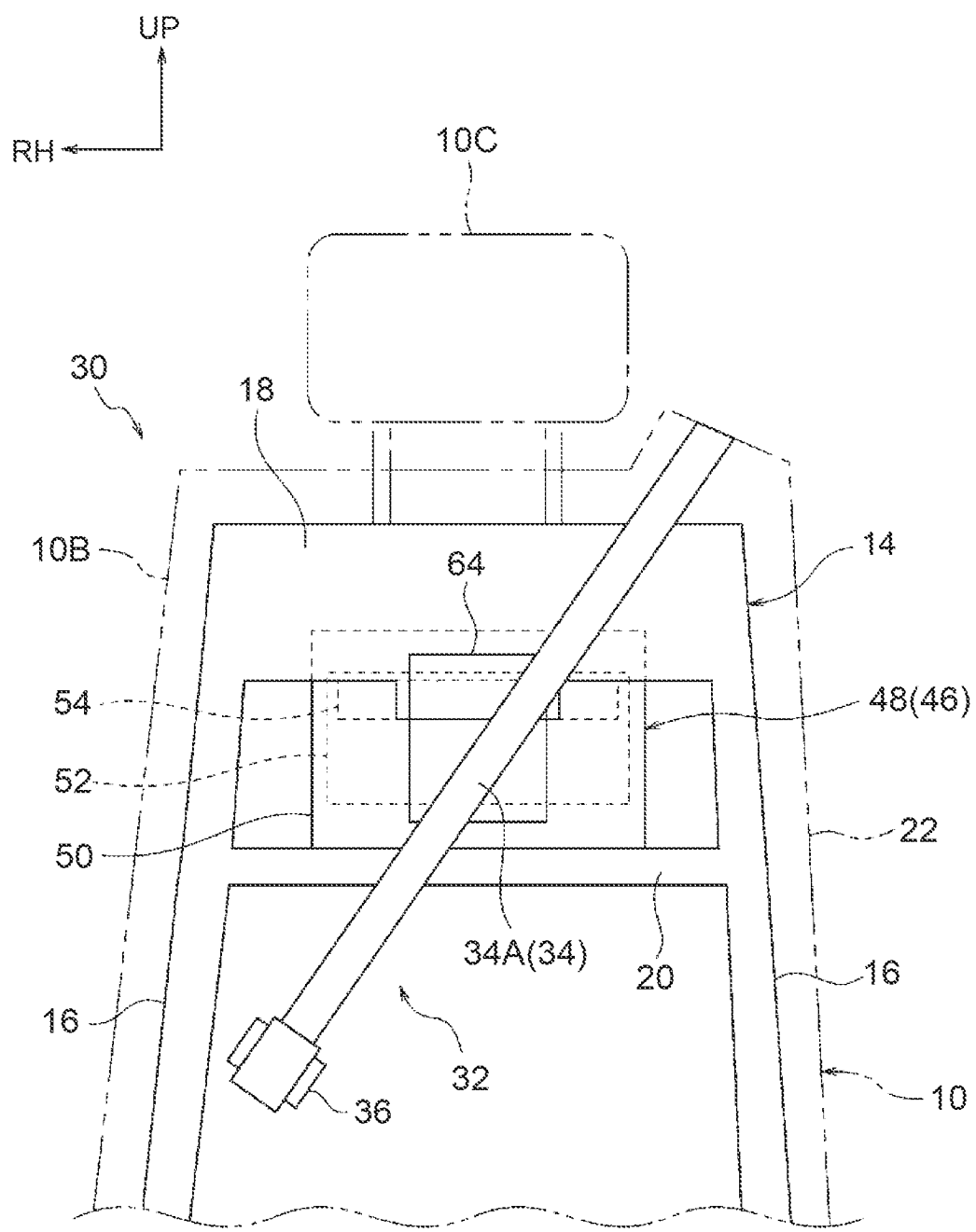
FIG. 8 is a front view, as seen from the vehicle front side, showing a configuration around the rear-seat airbag module in a vehicle seat according to a third embodiment.
Figure 9:
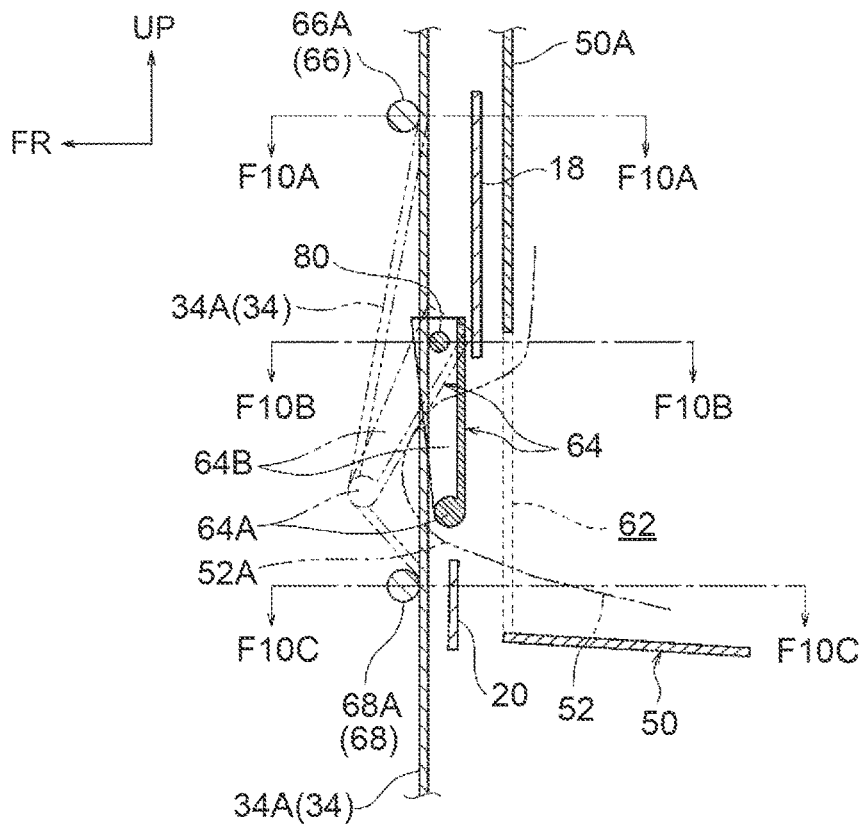
FIG. 9 is a sectional view, as seen from the vehicle left side, showing the configuration around the rear-seat airbag module in the vehicle seat according to the third embodiment.
Figure 10A:
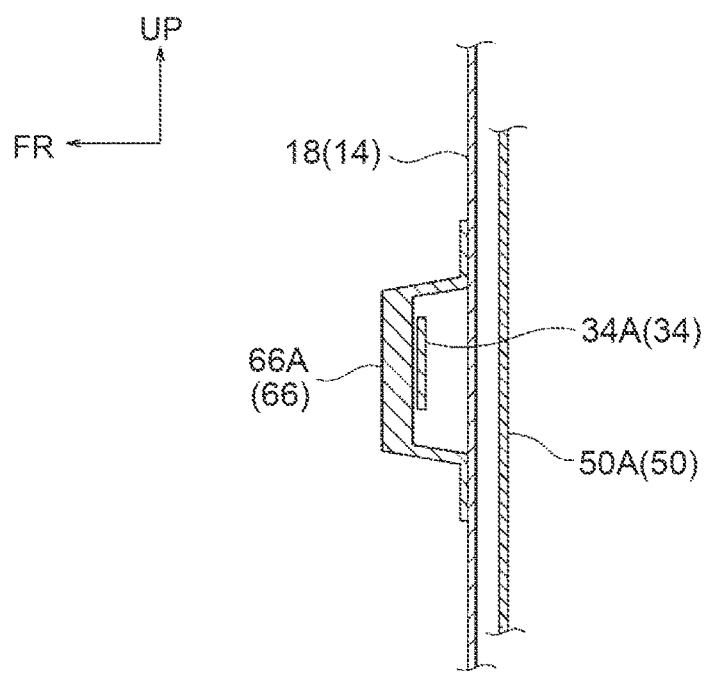
FIG. 10A is a sectional view showing a section cut along line F10A-F10A of FIG. 9.
Figure 10B:
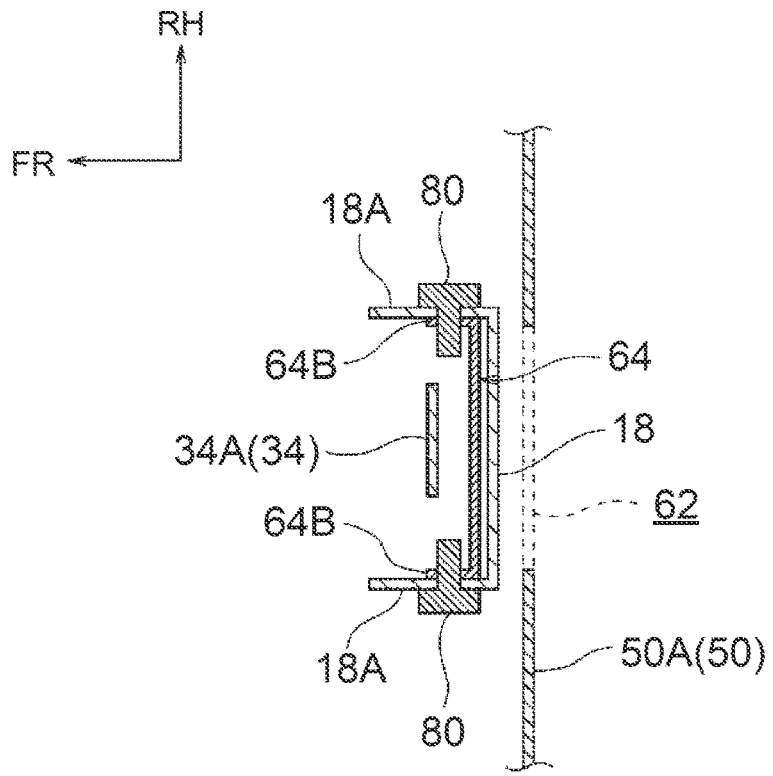
FIG. 10B is a sectional view showing a section cut along line F10B-F10B of FIG. 9.
Figure 10C:
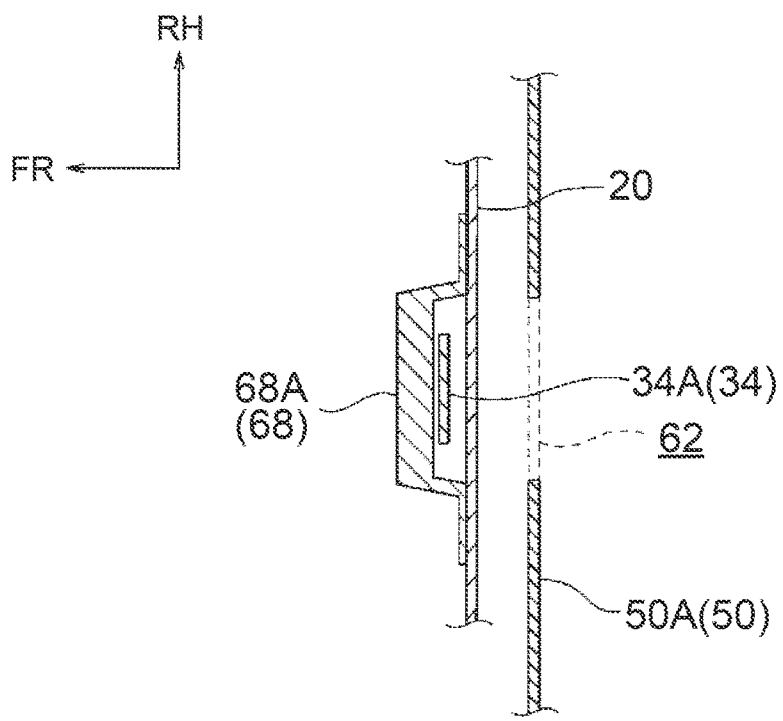
FIG. 10C is a sectional view showing a section cut along line F10C-F10C of FIG. 9.

FIG. 8 is a front view, as seen from the vehicle front side, showing a configuration around the rear-seat airbag module 48 in the front seat 10 as a vehicle seat according to a third embodiment of the disclosure. FIG. 9 is a sectional view, as seen from the vehicle left side, showing the configuration around the rear-seat airbag module 48 in the front seat 10 as the vehicle seat according to the third embodiment. Further, FIG. 10A is a sectional view showing a section cut along line F10A-F10A of FIG. 9. FIG. 10B is a sectional view showing a section cut along line F10B-F10B of FIG. 9. FIG. 10C is a sectional view showing a section cut along line F10C-F10C of FIG. 9.

In this embodiment, the pressing member 64 is mounted not on the module case 50 but on the frame 14. While the pressing member 64 has basically the same configuration as in the first embodiment, a pair of right and left flanges 64B protruding toward the front side are formed on right and left sides of the pressing member 64 as shown in FIG. 9 and FIG. 10B. In FIG. 8, the pressing member 64 is schematically depicted. In this embodiment, as shown in FIG. 10B, a portion of the upper frame part 18 of the frame 14 has a substantially U-shape that is open on the front side as seen in a plan view. Thus, a pair of right and left projections 18A facing each other in the right-left direction are formed on the upper frame part 18. An upper end of the pressing member 64 is disposed between the projections 18A, and a pair of right and left support shafts 80 that extend through the projections 18A from outer sides in the right-left direction extend through upper ends of the right and left flanges 64B from the outer sides in the right-left direction. The support shafts 80 are coaxially disposed with an axial direction thereof lying in the right-left direction. The pressing member 64 is supported on the upper frame part 18 through the support shafts 80 so as to be able to turn.

The pressing member 64 is disposed in a position facing the opening 62 formed in the front wall of the module case 50 from the front side. The opening 62 here is formed so as to be smaller than that in the first embodiment, and is formed at a lower part of the module case 50. Also in this embodiment, as shown in FIG. 9, FIG. 10A, and FIG. 10C, on both sides of the pressing member 64 in the up-down direction, the one end side 34A of the seatbelt 34 is held by the holding members 66, 68 so as to be able to slide in the up-down direction.

The configuration of this embodiment is otherwise the same as that of the first embodiment. Also in this embodiment, when the airbag 52 inflates and deploys, i.e., in the event of a frontal collision of the vehicle, the part 52A of the airbag 52 inflates toward the front side through the opening 62 and presses the seatbelt 34 toward the front side through the pressing member 64. Thus, a pretensioner function is fulfilled and effects that are basically the same as in the first embodiment are produced.

Fourth Embodiment

Figure 12:
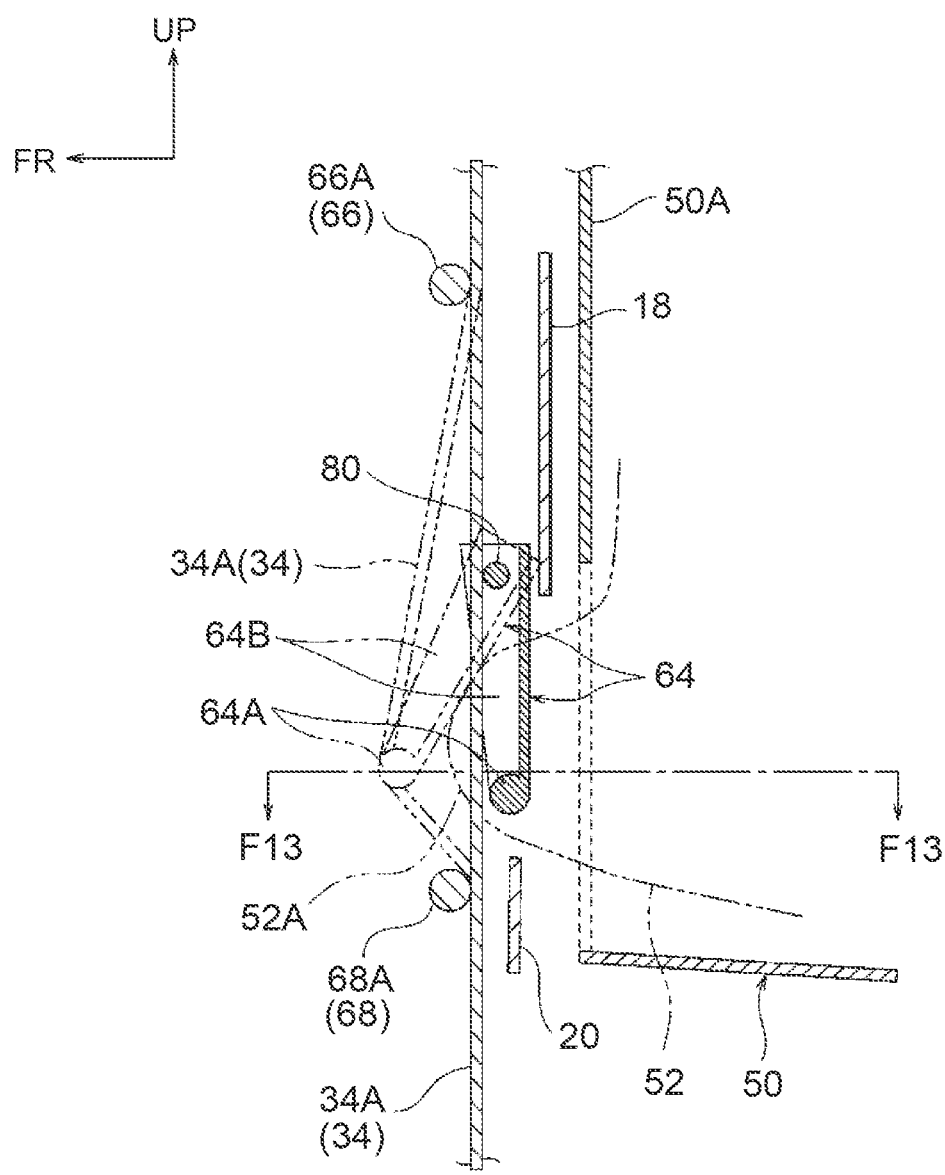
FIG. 12 is a sectional view, as seen from the vehicle left side, showing the configuration around the rear-seat airbag module in the vehicle seat according to the fourth embodiment.
Figure 13:
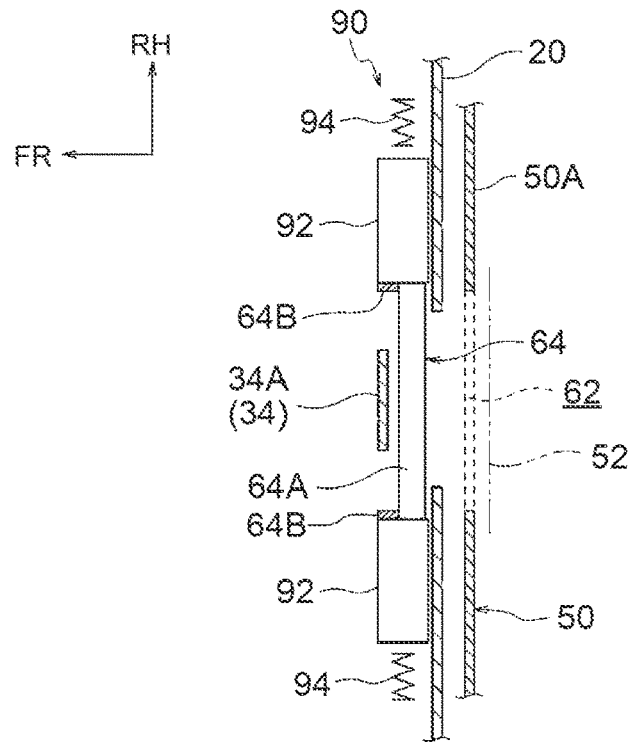
FIG. 13 is a sectional view showing a section cut along line F13-F13 of FIG. 12.

FIG. 11 is a front view, as seen from the vehicle front side, showing a configuration around the rear-seat airbag module 48 in the front seat 10 as a vehicle seat according to a fourth embodiment of the disclosure. FIG. 12 is a sectional view, as seen from the vehicle left side, showing a configuration around the rear-seat airbag module 48 in the front seat 10 as the vehicle seat according to the fourth embodiment. Further, FIG. 13 is a sectional view showing a section cut along line F13-F13 of FIG. 12.

In this embodiment, as in the third embodiment, the pressing member 64 is mounted not on the module case 50 but on the frame 14. In this embodiment, a force limiter mechanism 90 is supported on the frame 14. The force limiter mechanism 90 has a pair of right and left energy absorbing members 92 that are disposed respectively on outer sides, in the right-left direction, of the pressing member 64 located in the retracted position. For example, the right and left energy absorbing members 92 are made of resin foam and have a form of a block. As one example, the right and left energy absorbing members 92 are disposed on the front side of the intermediate frame part 20 and supported so as to be able to slide in the right-left direction relatively to the intermediate frame part 20.

Figure 14:
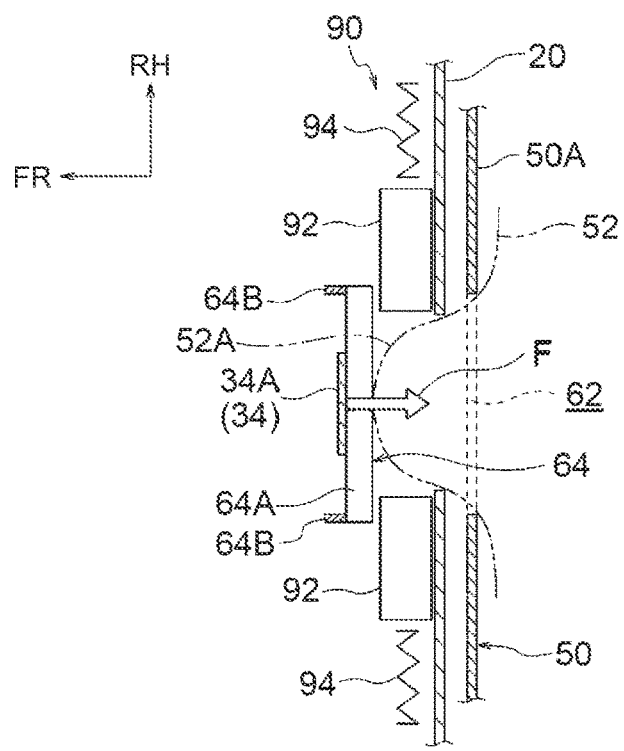
FIG. 14 is a sectional view corresponding to FIG. 13, showing a state where a pressing member has shifted toward a seat front side.

A pair of right and left helical compression springs 94 as one example of the urging member are disposed respectively on outer sides of the right and left energy absorbing members 92 in the right-left direction. The right and left helical compression springs 94 urge the right and left energy absorbing members 92 toward the pressing member 64, and the right and left energy absorbing members 92 are pressed respectively against right and left side surfaces of the pressing member 64. When the pressing member 64 turns toward the front side under the inflation pressure of the part 52A of the airbag 52, the right and left energy absorbing members 92 are shifted toward the rear side of the pressing member 64 (see FIG. 14). A restraining load exerted by the seatbelt 34 on the front-seat occupant P1 is applied to the energy absorbing members 92 through the pressing member 64 (see arrow F in FIG. 14).

Specifically, the load of the front-seat occupant P1 who tries to move inertially toward the front side due to the shock of a frontal collision of the vehicle is applied to the seatbelt 34, and a pulling force is thereby exerted on the seatbelt 34. Then, a pressing force toward the rear side is applied from the one end side 34A of the seatbelt 34 to the pressing member 64 that has shifted to the advanced position. Thus, the right and left energy absorbing members 92 are compressed in the front-rear direction between the pressing member 64 and the intermediate frame part 20. As a result, the right and left energy absorbing members 92 undergo plastic deformation and thereby absorb the inertial energy of the front-seat occupant P1.

The configuration of this embodiment is otherwise the same as that of the first embodiment. Also in this embodiment, when the airbag 52 inflates and deploys, i.e., in the event of a frontal collision of the vehicle, the part 52A of the airbag 52 inflates toward the front side through the opening 62 and presses the seatbelt 34 toward the front side through the pressing member 64. Thus, a pretensioner function is fulfilled and effects that are basically the same as in the first embodiment are produced. Moreover, in this embodiment, the restraining load exerted by the seatbelt 34 on the front-seat occupant P1 is applied to the right and left energy absorbing members 92 through the pressing member 64, and the right and left energy absorbing members 92 undergo plastic deformation. Thus, a force limiter function is fulfilled, so that the load applied from the seatbelt 34 to the chest etc. of the front-seat occupant P1 can be relieved and the burden on the front-seat occupant P1 can be reduced.

In this embodiment, the right and left energy absorbing members 92 of the force limiter mechanism 90 are pressed by the right and left helical compression springs 94 against the pressing member 64 that has not yet shifted toward the seat front side. When the pressing member 64 shifts toward the front side, the right and left energy absorbing members 92 shift toward the rear side of the pressing member 64 under the urging force of the right and left helical compression springs 94. Thus, using the right and left helical compression springs 94 (urging members) can simplify the configuration for shifting the right and left energy absorbing members 92.

In the fourth embodiment, the right and left energy absorbing members 92 are urged by the right and left helical compression springs 94. However, the disclosure is not limited to this configuration, and the urging member may be other type of elastic member. Further, a configuration may be adopted in which the energy absorbing members are shifted using an actuator, such as a solenoid, instead of the urging member.

While the disclosure has been described above using some embodiments as examples, the disclosure can be implemented with various changes made thereto within the scope of the gist of the disclosure. It should be understood that the technical scope of the disclosure is not limited to the above-described embodiments.

What is claimed is:

1. An occupant crash protection comprising:
   a seatbelt that restrains an occupant sitting in a vehicle seat;

a retractor that is installed inside a seatback of the vehicle seat and reels in one end side of the seatbelt, inserted inside the seatback, so as to allow the seatbelt to be pulled out; and a rear-seat airbag module that is installed inside the seatback, on a seat rear side relative to the seatbelt, and inflates and deploys an airbag toward the seat rear side of the seatback while inflating a part of the airbag toward a seat front side so as to press the seatbelt toward the seat front side.

2. The occupant crash protection according to claim 1, further comprising a pressing member that is supported so as to be able to shift in a seat front-rear direction relatively to a frame of the seatback, and that shifts toward the seat front side under an inflation pressure of the part of the airbag and presses the seatbelt toward the seat front side.

3. The occupant crash protection according to claim 2, wherein the pressing member is supported so as to be able to turn relatively to the frame.

4. The occupant crash protection according to claim 2, wherein:

the rear-seat airbag module has a module case, and the module case houses the airbag and is mounted on the frame; and the pressing member is mounted on the module case so as to be able to shift relatively to the module case.

5. The occupant crash protection according to claim 1, wherein:

the rear-seat airbag module has a module case, and the module case houses the airbag and is mounted on a frame of the seatback; and the module case has an opening through which the part of the inflating and deploying airbag bulges toward the seat front side, and the seatbelt is pressed toward the seat front side by the part.

6. The occupant crash protection according to claim 5, wherein the rear-seat airbag module has a fabric member that is interposed between an edge of the opening and the airbag.

7. The occupant crash protection according to claim 2, further comprising a force limiter mechanism that has an energy absorbing member supported on the frame of the seatback and shifts the energy absorbing member toward the seat rear side of the pressing member as the pressing member shifts toward the seat front side, wherein the energy absorbing member deforms when a restraining load exerted by the seatbelt on the occupant is applied to the energy absorbing member through the pressing member.

8. The occupant crash protection according to claim 7, wherein:

the force limiter mechanism has an urging member that presses the energy absorbing member against the pressing member that has not yet shifted toward the seat front side; and as the pressing member shifts toward the seat front side, the energy absorbing member shifts toward the seat rear side of the pressing member under an urging force of the urging member.

9. A vehicle seat comprising:

a seat main body having a seat cushion and a seatback; and the occupant crash protection according to claim 1 that has the retractor and the rear-seat airbag module installed inside the seatback.

10. The occupant crash protection according to claim 1, wherein:

the seatbelt restrains a front seat occupant sitting in a front seat of the vehicle.

11. The occupant crash protection according to claim 1, wherein:

the rear-seat airbag module inflates and deploys the airbag in the event of a frontal collision of the vehicle.

* * * * *